(12) United States Patent
Saine

(10) Patent No.: US 10,272,464 B2
(45) Date of Patent: Apr. 30, 2019

(54) ACTIVE ADHESIVE RECIRCULATION REGULATION

(71) Applicant: NORDSON CORPORATION, Westlake, OH (US)

(72) Inventor: Joel E. Saine, Dahlonega, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 15/698,036

(22) Filed: Sep. 7, 2017

(65) Prior Publication Data

US 2018/0065137 A1    Mar. 8, 2018

Related U.S. Application Data

(60) Provisional application No. 62/385,238, filed on Sep. 8, 2016.

(51) Int. Cl.
   *B05C 11/10*    (2006.01)
   *B05C 5/02*     (2006.01)
   (Continued)

(52) U.S. Cl.
   CPC ...... *B05C 11/1007* (2013.01); *B05B 11/3049* (2013.01); *B05B 15/65* (2018.02);
   (Continued)

(58) Field of Classification Search
   USPC .......................................................... 156/578
   See application file for complete search history.

(56) References Cited

U.S. PATENT DOCUMENTS

| | | |
|---|---|---|
| 5,236,641 A | 8/1993 | Allen et al. |
| 5,409,642 A | 4/1995 | Allen et al. |

(Continued)

FOREIGN PATENT DOCUMENTS

| | | |
|---|---|---|
| DE | 4121792 A1 | 1/1993 |
| DE | 202004001480 U1 | 4/2004 |

(Continued)

OTHER PUBLICATIONS

ISA/220—Notification of Transmittal or Search Report and Written Opinion of the ISA, or the Declaration dated Dec. 20, 2017 for WO Application No. PCT/US17/050373.
ISA/220—Notification of Transmittal or Search Report and Written Opinion of the ISA, or the Declaration dated Dec. 20, 2017 for WO Application No. PCT/US17/050368.
ISA/206—Invitation to Pay Additional Fees dated Jan. 5, 2018 for WO Application No. PCT/US17/50406.

(Continued)

*Primary Examiner* — Sing P Chan
(74) *Attorney, Agent, or Firm* — Baker & Hostetler LLP

(57) ABSTRACT

An applicator for dispensing adhesive is disclosed. The applicator includes a manifold, at least one dispensing module coupled to the manifold, a supply channel configured to contain at least a portion of the adhesive, a recirculation channel configured to contain at least a portion of the adhesive, and a recirculation pump assembly connected to the manifold. The recirculation pump assembly includes an inlet in fluid communication with the recirculation channel, an outlet in fluid communication with the supply channel, a gear assembly, and a drive motor coupled to the gear assembly and operable to pump the adhesive, where the drive motor is configured to operate at an adjustable number of revolutions per minute (RPM). The recirculation pump assembly can be configured to move at least a portion of the adhesive from the recirculation channel to the supply channel, such that a first pressure of the adhesive in the recirculation channel is substantially equal to a second pressure of the adhesive in the supply channel.

14 Claims, 14 Drawing Sheets

(51) Int. Cl.

| | |
|---|---|
| *B05B 11/00* | (2006.01) |
| *B05B 15/65* | (2018.01) |
| *B05C 19/00* | (2006.01) |
| *F04C 14/08* | (2006.01) |
| *B05C 5/00* | (2006.01) |
| *B05B 9/04* | (2006.01) |
| *F04D 15/00* | (2006.01) |
| *F04B 49/20* | (2006.01) |
| *B32B 37/12* | (2006.01) |
| *B01F 5/14* | (2006.01) |
| *B01F 5/10* | (2006.01) |
| *B05C 11/02* | (2006.01) |

(52) U.S. Cl.
CPC .............. *B05C 5/02* (2013.01); *B05C 5/0225* (2013.01); *B05C 5/0279* (2013.01); *B05C 11/025* (2013.01); *B05C 11/1026* (2013.01); *B05C 11/1042* (2013.01); *B05C 11/1044* (2013.01); *B05C 19/008* (2013.01); *B01F 5/108* (2013.01); *B01F 5/14* (2013.01); *B05B 9/0403* (2013.01); *B05C 5/001* (2013.01); *B05C 5/027* (2013.01); *B05C 5/0258* (2013.01); *B05C 11/1002* (2013.01); *B05C 11/1039* (2013.01); *B32B 37/1284* (2013.01); *F04B 49/20* (2013.01); *F04C 14/08* (2013.01); *F04D 15/0066* (2013.01)

(56) References Cited

U.S. PATENT DOCUMENTS

| | | | |
|---|---|---|---|
| 5,862,986 A | 1/1999 | Bolyard et al. | |
| 6,089,413 A | 7/2000 | Riney et al. | |
| 6,210,141 B1 | 4/2001 | Allen | |
| 6,296,463 B1 | 10/2001 | Allen | |
| 6,422,428 B1 | 7/2002 | Allen et al. | |
| 6,517,891 B1 | 2/2003 | Estelle et al. | |
| 6,607,104 B2 | 8/2003 | McGuffey | |
| 6,688,498 B1 | 2/2004 | McGuffey | |
| 7,699,243 B2 | 4/2010 | Starke | |
| 8,445,061 B2 | 5/2013 | McGuffey | |
| 9,126,222 B2 | 9/2015 | McGuffey | |
| 9,415,415 B1 | 8/2016 | Jones | |
| 9,427,766 B2 | 8/2016 | Varga | |
| 9,573,159 B2 | 2/2017 | McGuffey | |
| 9,925,552 B2 | 3/2018 | Saine | |
| 2002/0102324 A1 | 8/2002 | Groleau | |
| 2002/0139818 A1 | 10/2002 | McGuffey | |
| 2003/0062384 A1* | 4/2003 | McGuffey | B05C 5/0225 222/109 |
| 2004/0124251 A1 | 7/2004 | Gressett et al. | |
| 2004/0159672 A1 | 8/2004 | Auber et al. | |
| 2005/0230423 A1 | 10/2005 | Riney et al. | |
| 2005/0274317 A1 | 12/2005 | De et al. | |
| 2006/0182887 A1 | 8/2006 | Miller | |
| 2008/0135650 A1 | 6/2008 | Starke | |
| 2012/0048447 A1 | 3/2012 | Burmester et al. | |
| 2015/0190837 A1 | 7/2015 | Burmester et al. | |
| 2015/0352588 A1 | 12/2015 | Lessley et al. | |
| 2016/0256889 A1 | 9/2016 | Jones | |
| 2017/0097019 A1* | 4/2017 | Afshari | F15B 13/044 |
| 2017/0146035 A1 | 5/2017 | Afshari | |
| 2018/0065137 A1 | 3/2018 | Saine | |
| 2018/0065139 A1 | 3/2018 | Saine | |
| 2018/0065140 A1 | 3/2018 | Saine et al. | |

FOREIGN PATENT DOCUMENTS

| | | |
|---|---|---|
| EP | 1442798 A2 | 8/2004 |
| EP | 2289633 A2 | 3/2011 |
| EP | 3064280 A1 | 9/2016 |
| JP | 09-173917 A | 7/1997 |
| WO | 93/05212 A2 | 3/1993 |
| WO | 99/54055 A1 | 10/1999 |
| WO | 2007/084891 A2 | 7/2007 |
| WO | 2011/008390 A1 | 1/2011 |
| WO | 2011/025603 A1 | 3/2011 |

OTHER PUBLICATIONS

ISA/220—Notification of Transmittal or Search Report and Written Opinion of the ISA, or the Declaration dated Jan. 8, 2018 for WO Application No. PCT/US17/050380.

International Patent Application No. PCT/US2017/050406; Int'l Search Report and the Written Opinion; dated Mar. 19, 2018; 19 pages.

(IPEA/408) Written opinion under Chapter II dated Aug. 3, 2018 for WO Application No. PCT/US17/050417.

English Translation of International Preliminary Report on Patentability Chapter II or English Translation of International Preliminary Report on Patentability Chapter I dated Dec. 13, 2018 for WO Application No. PCT/US17/050417.

* cited by examiner

ACTIVE ADHESIVE RECIRCULATION REGULATION

CROSS REFERENCE TO RELATED APPLICATIONS

This application claims the benefit of U.S. Provisional Patent App. No. 62/385,238, filed Sep. 8, 2016, the disclosure of which is hereby incorporated by reference herein.

TECHNICAL FIELD

The present invention relates to an applicator for diverting an adhesive onto a substrate and having active recirculation through a pump assembly, the method of operation and the pump assembly.

BACKGROUND

Typical applicators for dispensing adhesive may include positive displacement fluid dispensers that intermittently apply a flow of adhesive to a substrate. The fluid dispensers actuate between an on cycle, during which adhesive is flowing through a nozzle of the dispenser, and an off cycle, during which adhesive is prevented from flowing through the nozzle of the dispenser. During the off cycle, unused adhesive builds up within the applicator, which leads to elevated pressures within the applicator. Upon commencing the next on cycle, the built-up adhesive within the applicator causes the adhesive to exit the dispenser nozzle at an inconsistent flow rate or a flow rate that is different than intended. This leads to adhesive pattern deformation on the substrate.

To remedy this issue, some applicators include not only supply channels but also recirculation channels that redirect unused adhesive back to the inlet of the pump assemblies within the applicator during the fluid dispenser off cycle, or alternatively back to the adhesive tank that supplies the adhesive to the applicator. Though the recirculation channel may redirect unused adhesive, the recirculation channel alone does not completely prevent pressure build-up within the applicator. When adhesive flows through the recirculation channel during a fluid dispenser off cycle, the adhesive flows at a pressure that is different than the pressure of the adhesive in the applicator supply channel that provides the pump assemblies within the applicator with adhesive from the adhesive tank. This pressure differential, which is a function of the unregulated pressures of the recirculation channels and the applicator supply channels, also cause the issues noted above in relation to an applicator that does not have a recirculation channel.

Therefore, there is a need for an applicator for dispensing adhesive that allows for active management and control of the adhesive pressure differential that exists between the recirculation channel and the applicator supply channels.

SUMMARY

The present invention includes an applicator for dispensing adhesive. The applicator includes a manifold, at least one dispensing module coupled to the manifold, a supply channel for containing at least a portion of the adhesive, a recirculation channel for containing at least a portion of the adhesive, and a recirculation pump assembly mounted to the manifold. The recirculation pump assembly includes an inlet in fluid communication with the recirculation channel, an outlet in fluid communication with the supply channel, a gear assembly, and a drive motor coupled to the gear assembly and operable to pump the adhesive, where the drive motor is configured to operate at an adjustable number of revolutions per minute (RPM). The recirculation pump assembly is configured to move at least a portion of the adhesive from the recirculation channel to the supply channel, such that a first pressure of the adhesive in the recirculation channel is substantially equal to a second pressure of the adhesive in the supply channel.

The present invention includes a method of managing pressure variance in an adhesive applicator. The method includes pumping adhesive from a supply channel through a module. The method also includes switching the module between an open configuration during which the adhesive flows into a nozzle and a closed configuration during which adhesive flows into a recirculation channel. The method then includes pumping, via a recirculation pump, at least a portion of the adhesive through the recirculation channel.

The present invention includes a recirculation pump assembly for pumping adhesive. The recirculation pump includes an inlet configured to receive the adhesive from a recirculation channel, an outlet configured to emit the adhesive to a supply channel, a gear assembly, and a drive motor. The drive motor is coupled to the gear assembly and is operable to pump the adhesive. The drive motor is further configured to operate at an adjustable number of revolutions per minute (RPM). The recirculation pump assembly is configured to move at least a portion of the adhesive from the recirculation channel to the supply channel, such that a first pressure of the adhesive in the recirculation channel is substantially equal to a second pressure of the adhesive in the supply channel.

BRIEF DESCRIPTION OF THE DRAWINGS

The foregoing summary, as well as the following detailed description, will be better understood when read in conjunction with the appended drawings. The drawings show illustrative embodiments of the invention. It should be understood, however, that the application is not limited to the precise arrangements and instrumentalities shown.

DETAILED DESCRIPTION OF ILLUSTRATIVE EMBODIMENTS

Figure 1:
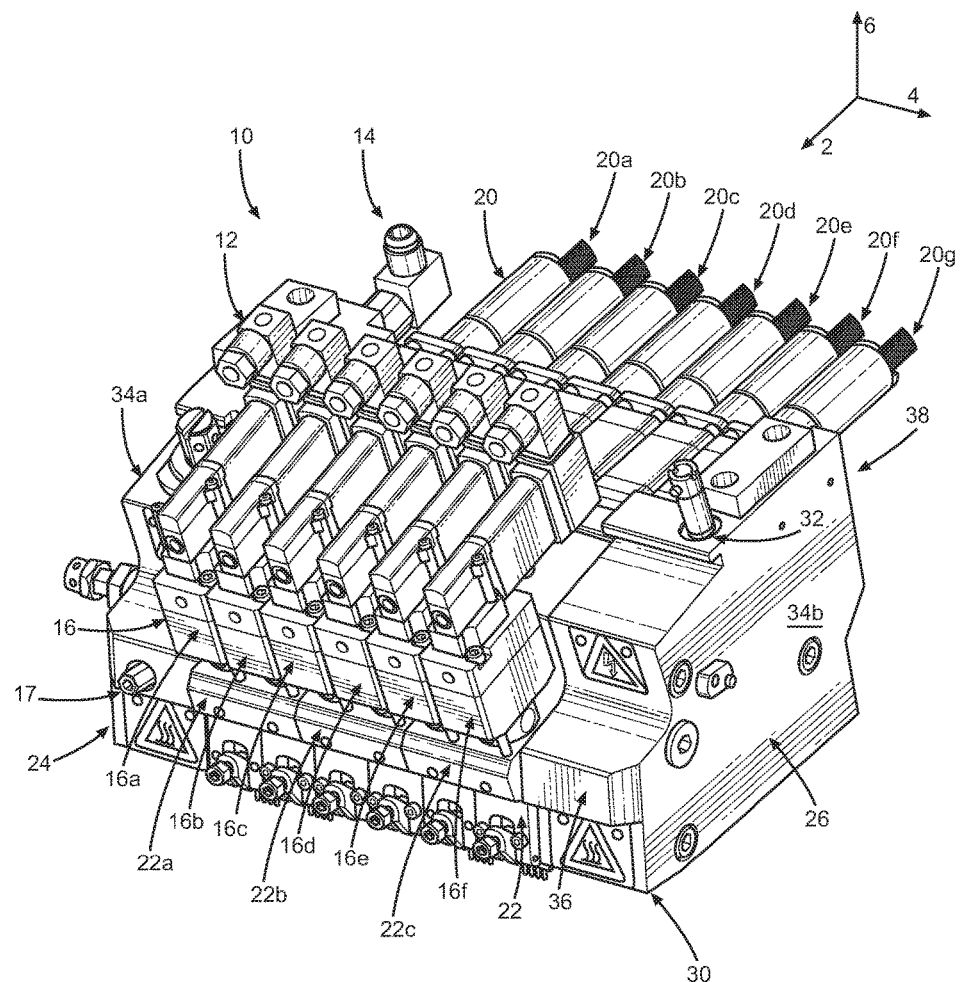
FIG. 1 is a front perspective view of an applicator according to an embodiment of the present invention.

Described herein is an applicator 10 that includes dispensing modules 16a-16f and pump assemblies 20a-20g, where pump assembly 20g is a dedicated recirculation pump assembly. The pump assembly 20g is operable independent of the pump assemblies 20a-20f, and controls the flow of adhesive through the recirculation channel 236. Certain terminology is used to describe the applicator 10 in the following description for convenience only and is not limiting. The words "right," "left," "lower," and "upper" designate directions in the drawings to which reference is made. The words "inner" and "outer" refer to directions toward and away from, respectively, the geometric center of the description to describe the applicator 10 and related parts thereof. The words "forward" and "rearward" refer to directions in a longitudinal direction 2 and a direction opposite the longitudinal direction 2 along the applicator 10 and related parts thereof. The terminology includes the above-listed words, derivatives thereof, and words of similar import.

Unless otherwise specified herein, the terms "longitudinal," "transverse," and "lateral" are used to describe the orthogonal directional components of various components of the applicator 10, as designated by the longitudinal direction 2, lateral direction 4, and transverse direction 6. It should be appreciated that while the longitudinal and lateral directions 2 and 4 are illustrated as extending along a horizontal plane, and the transverse direction 6 is illustrated as extending along a vertical plane, the planes that encompass the various directions may differ during use.

Embodiments of the present invention include an applicator 10 for dispensing adhesive onto a substrate during product manufacturing. Referring to FIGS. 1-5, the applicator 10 includes a manifold 12. The applicator 10 has a top surface 32, a bottom surface 30 opposite the top surface 32 along the transverse direction 6, a first side surface 34a, a second side surface 34b opposite the first side surface 34a along the lateral direction 4, a front surface 36, and a back surface 38 opposite the front surface 36 along the longitudinal direction 2. The first and second side surfaces 34a and 34b extend from the front surface 36 to the back surface 38, as well as from the bottom surface 30 to the top surface 32. The manifold 12 is defined by a first end plate 24, a second end plate 26, and at least one manifold segment 22 disposed between the first and second end plates 24 and 26. As a result, the first and second end plates 24 and 26 are spaced apart along the lateral direction 4. The first and second end plates 24 and 26 and the manifold segments 22 may be releasably connected such that manifold segments 22 may be added or taken away from the applicator 10 as operating conditions require. As a result, even though FIGS. 1-5 show applicator 10 as including three manifold segments 22a-22c, applicator 10 can include more or less manifold segments 22 may as desired. However, in another embodiment, the manifold 12 may be a unitary manifold.

Figure 2:
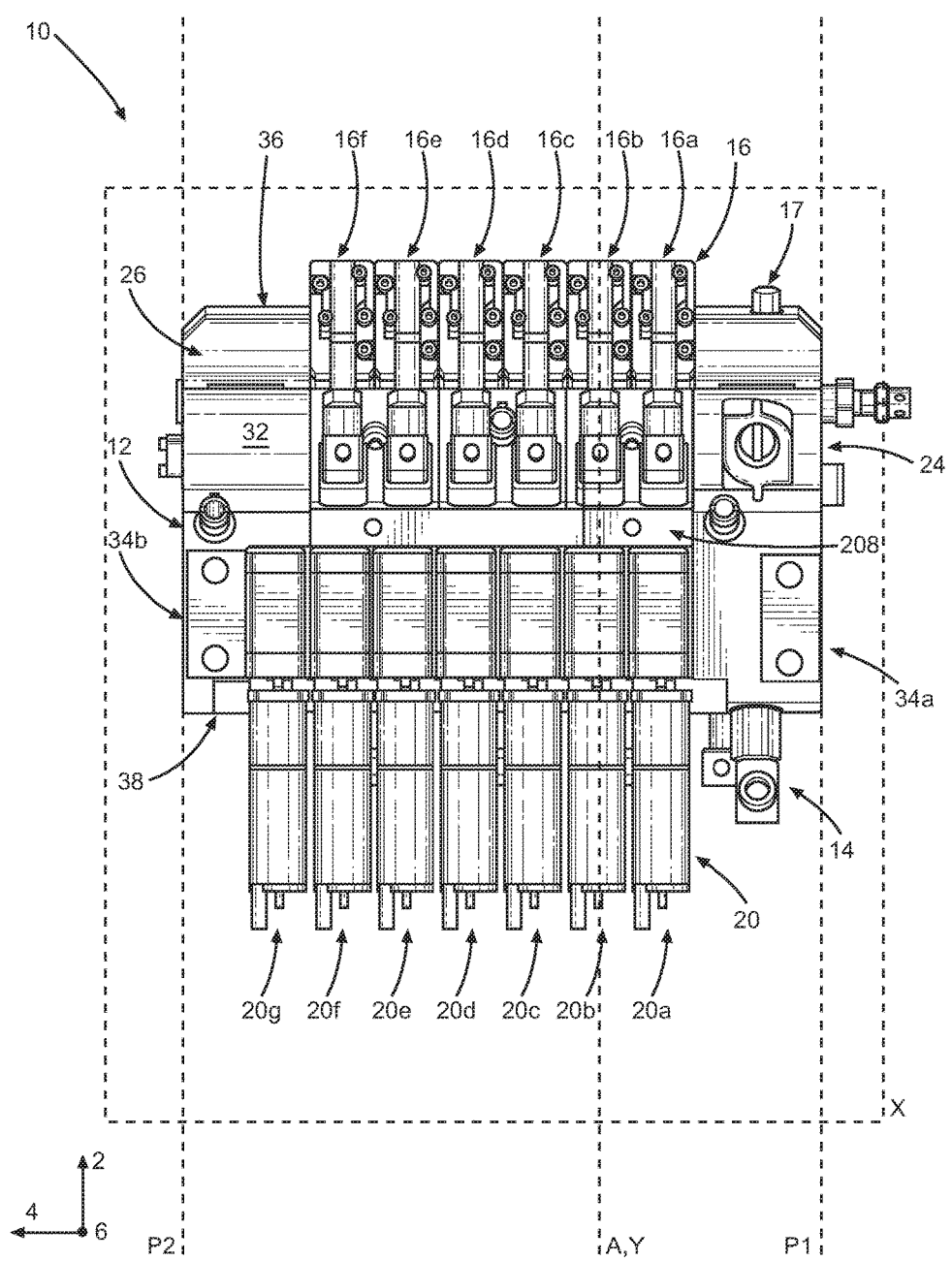
FIG. 2 is a top view of the applicator shown in FIG. 1.
Figure 3:
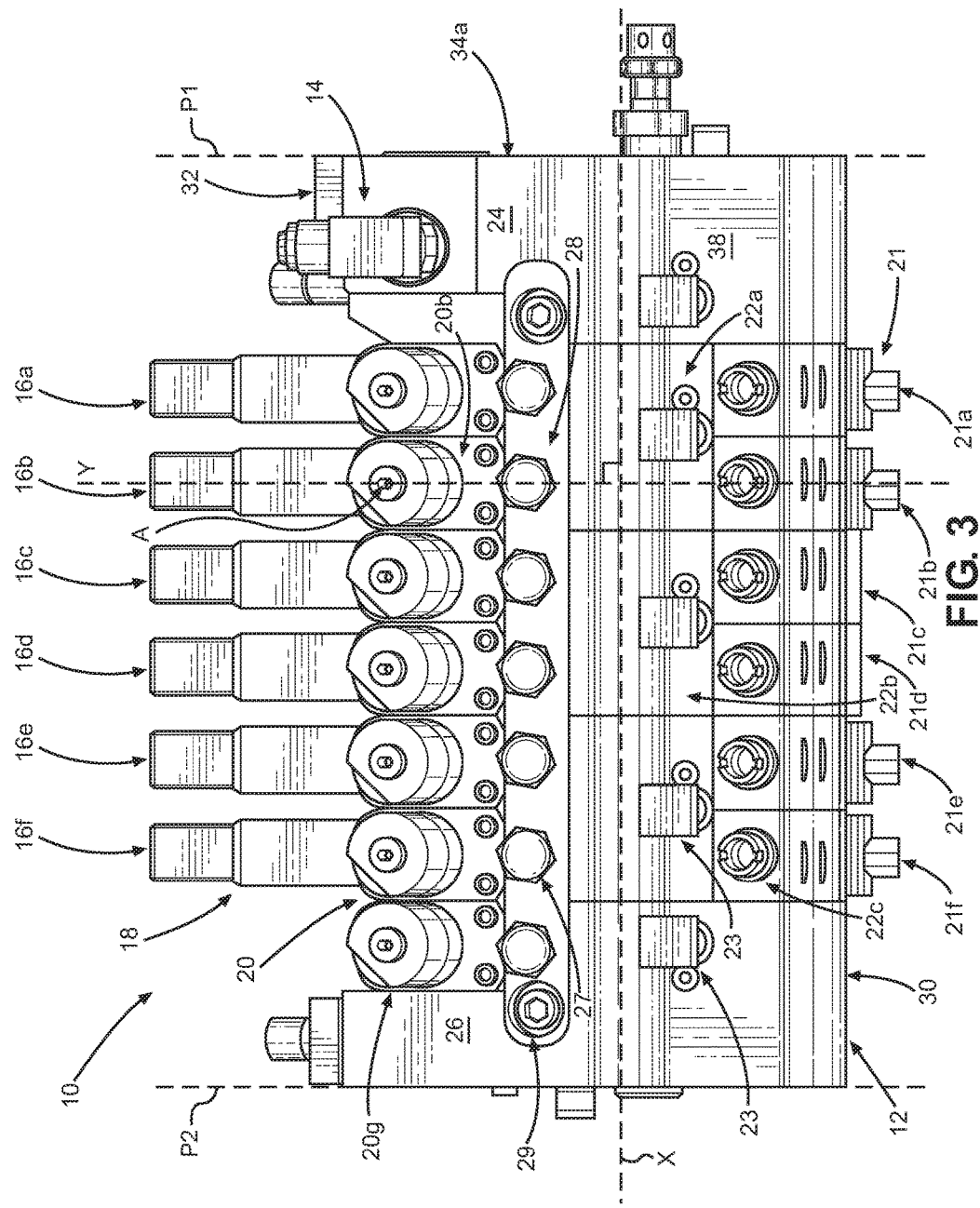
FIG. 3 is a rear view of the applicator shown in FIG. 1.
Figure 4:
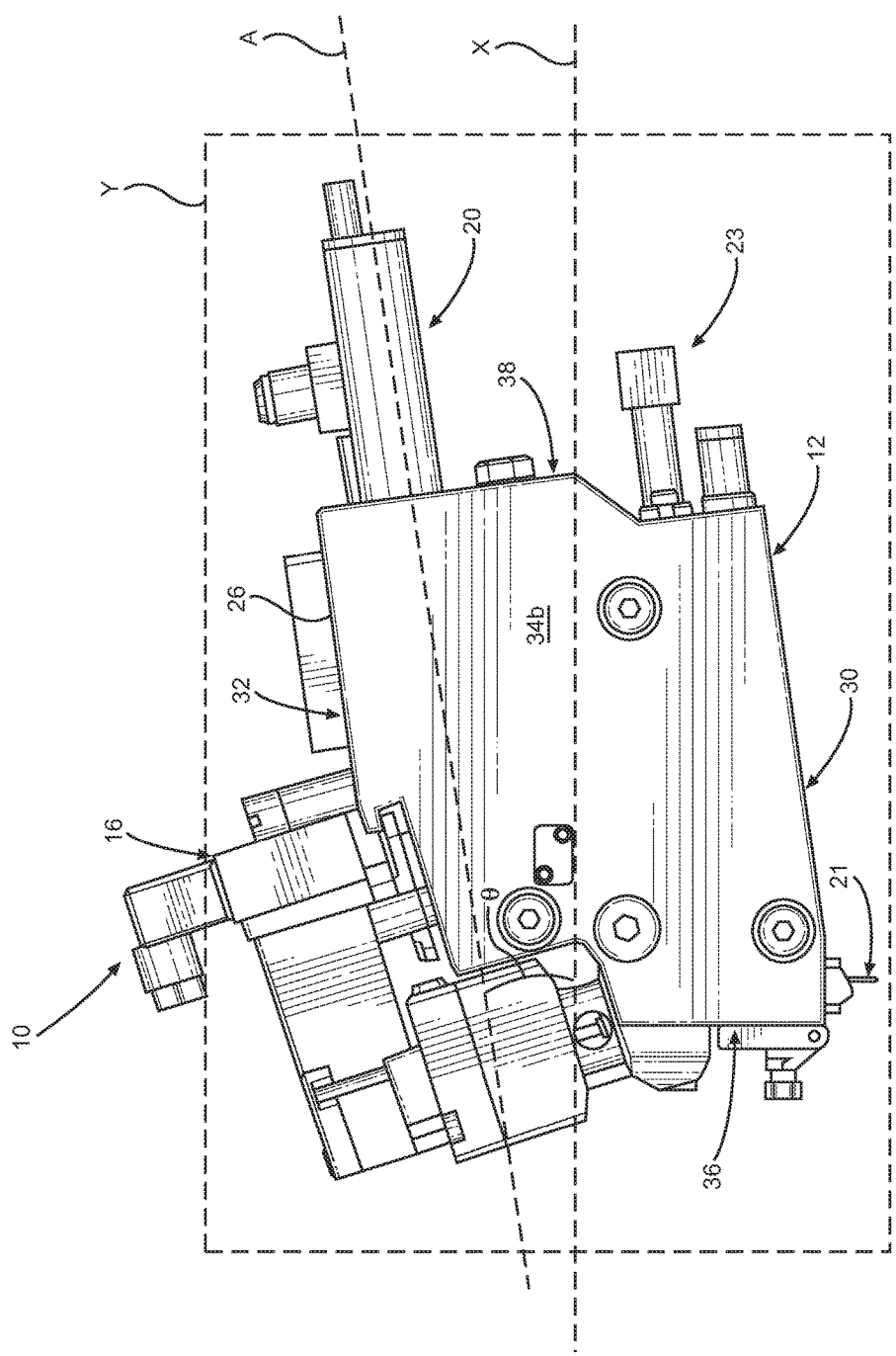
FIG. 4 is a side view of the applicator shown in FIG. 1.

Referring to FIGS. 2-4, the first side surface 34a of the manifold 12 lies within a first plane P1, while the second side surface 34b lies within a second plane P2. The second plane P2 may be parallel to the first plane P1. However, the first and second planes P1 and P2 may not be parallel if the first and second side surfaces 34a and 34b are angled with respect to each other. The applicator 10 defines a horizontal plane X, such that the lateral and longitudinal directions 4 and 2 lie within the horizontal plane X. The pump assembly 20 may define a drive shaft axis A that lies within a plane Y. The interrelationship of these planes and axes will be described further below.

The applicator 10 includes an input connector 14, through which adhesive is pumped into the manifold 12. The manifold 12 may further include a pressure release valve 17 that allows a user to attenuate pressure created by adhesive within the manifold, and a dispensing module 16 for applying the adhesive to a substrate. When the pressure release valve 17 is opened, adhesive may drain from the manifold through a drain (not shown). The applicator 10 also includes a pump assembly 20 removably mounted to the manifold 12. The pump assembly 20 pumps adhesive flowing from an interior channel of the manifold 12 to the dispensing module 16, which then dispenses adhesive out of the applicator through a nozzle 21. The applicator 10 may include thermal elements 23 that are configured to elevate the temperature of the manifold 12, which, in turn, elevates the temperature of the pump 40 in each pump assembly 20. Though FIGS. 1-5 depict the applicator 10 as including five thermal elements 23a-23e, any number of thermal elements 23 can be included as required.

In various embodiments, the applicator 10 includes multiple sets of pump assemblies 20, dispensing modules 16, and nozzles 21. As illustrated in FIGS. 1-5, for example, the applicator 10 is depicted as including seven pump assemblies 20a, 20b, 20c, 20d, 20e, 20f, and 20g. Although FIGS. 1-5 illustrate seven pump assemblies 20a-20g, the applicator 10 can include any number of pump assemblies 20 as desired. For example, the applicator 10 can include two pump assemblies, three pump assemblies, or more than three pump assemblies. The pump assemblies 20a-20g may be arranged in a side-by-side configuration to increase the processing width of the applicator 10. For clarity, a single pump assembly 20 is described below. However, reference number 20 can be used interchangeably with reference numbers 20a-20g. Though the pump assemblies 20a-20g are depicted as being similarly sized, each of the individual pump assemblies 20 included in the applicator 10 can be individually sized as desired to suit a particular purpose. For example, the recirculation pump assembly 20g, which will be described further below, may be larger than the other pump assemblies 20a-20f.

Additionally, the applicator 10 is depicted as including six dispensing modules 16a, 16b, 16c, 16d, 16e, and 16f. Although FIGS. 1-3 illustrate six dispensing modules 16a-16f, the applicator can include any number of dispensing modules 16 as desired. For example, the applicator 10 can include one dispensing module, two dispensing modules, or more than two dispensing modules. Similarly, a single dispensing module 16 is described below. However, the reference number 16 can be used interchangeably with reference numbers 16a-16f. The applicator 10 is also depicted as including six nozzles 21a, 21b, 21c, 21d, 21e, and 21f. Each of nozzles 21a-21f may receive an adhesive feed from a corresponding dispensing module 16, or a combination of several of the dispensing modules 16a-16f. The configuration of the nozzles 21a-21f can be changed by a user as operation conditions require, which can include adding additional nozzles 21 or removing any of the nozzles 21a-21f that are already coupled to the applicator 10. Additionally, the nozzles 21a-21f can be differently types chosen to suit particular dispensing applications. For example, as shown in FIG. 3, nozzles 21a, 21b, 21e, and 21f can be one type of nozzle, while nozzles 21c and 21d can be a different type of nozzle.

Continuing with FIGS. 1-5, each of pump assemblies 20a-20f may be associated with a corresponding one of the dispensing modules 16a-16f. In operation, each of pump assemblies 20a-20f may pump fluid that is supplied by the manifold 12 to the corresponding one of the dispensing modules 16a-16f, such that the dispensing modules 16a-16f apply the adhesive to a given substrate through nozzles 21a-21d. However, each dispensing module 16 may not correspond to a single pump assembly 20, such that multiple pump assemblies 20 pump adhesive to a single dispensing module 16. Additionally, each of the pump assemblies 20 and each of the dispensing modules 16 may be coupled to and associated with a respective manifold segment 22. However, two or more pump assemblies 20 and/or two or more dispensing modules 16 may be coupled to a single manifold segment 22.

Figure 5:
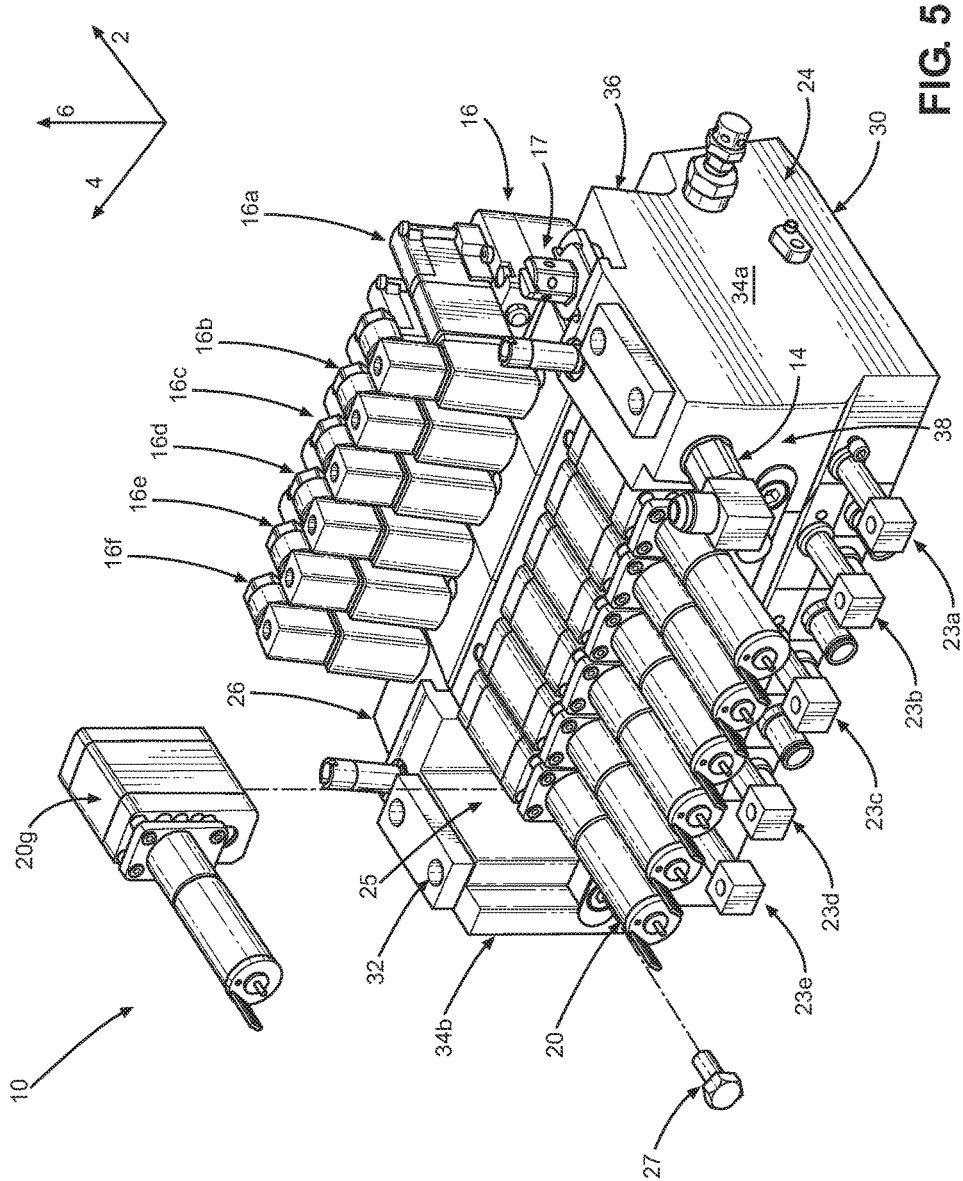
FIG. 5 is a rear perspective view of the applicator shown in FIG. 1, with a recirculation pump assembly removed from the applicator.
Figure 6:
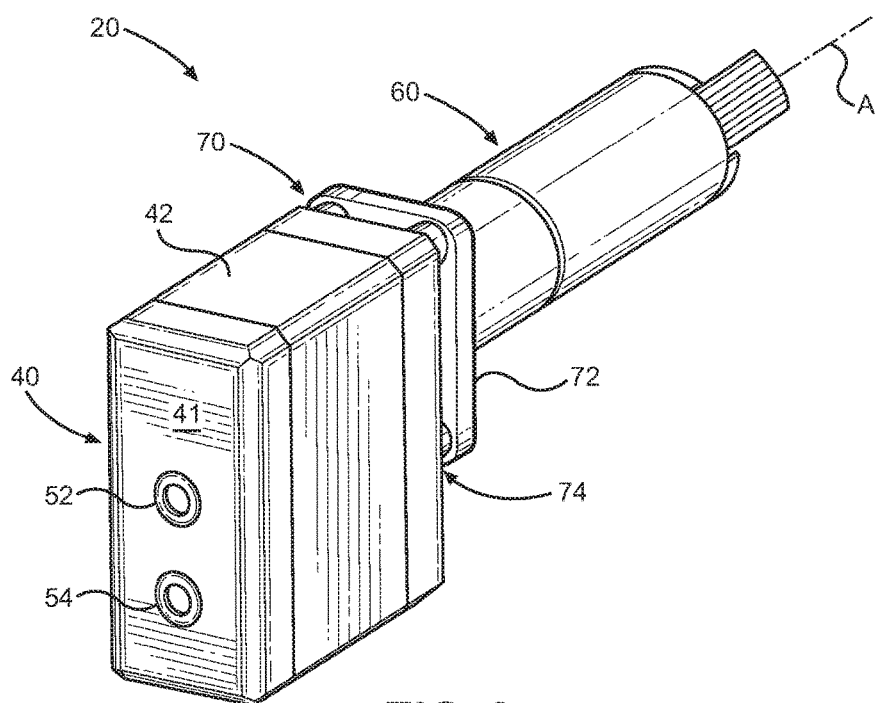
FIG. 6 is a bottom perspective view of a pump assembly used in the applicator shown in FIG. 1.
Figure 7:
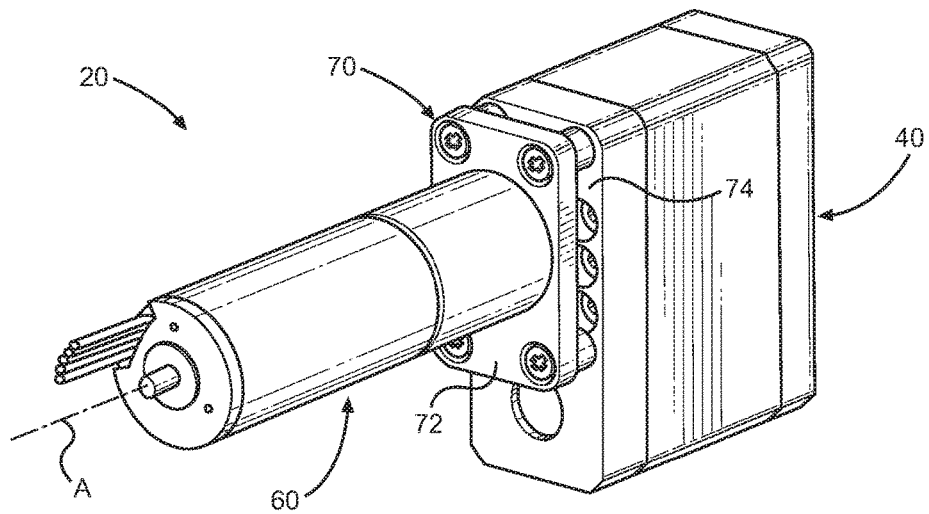
FIG. 7 is a top perspective view of the pump assembly shown in FIG. 6.
Figure 8:
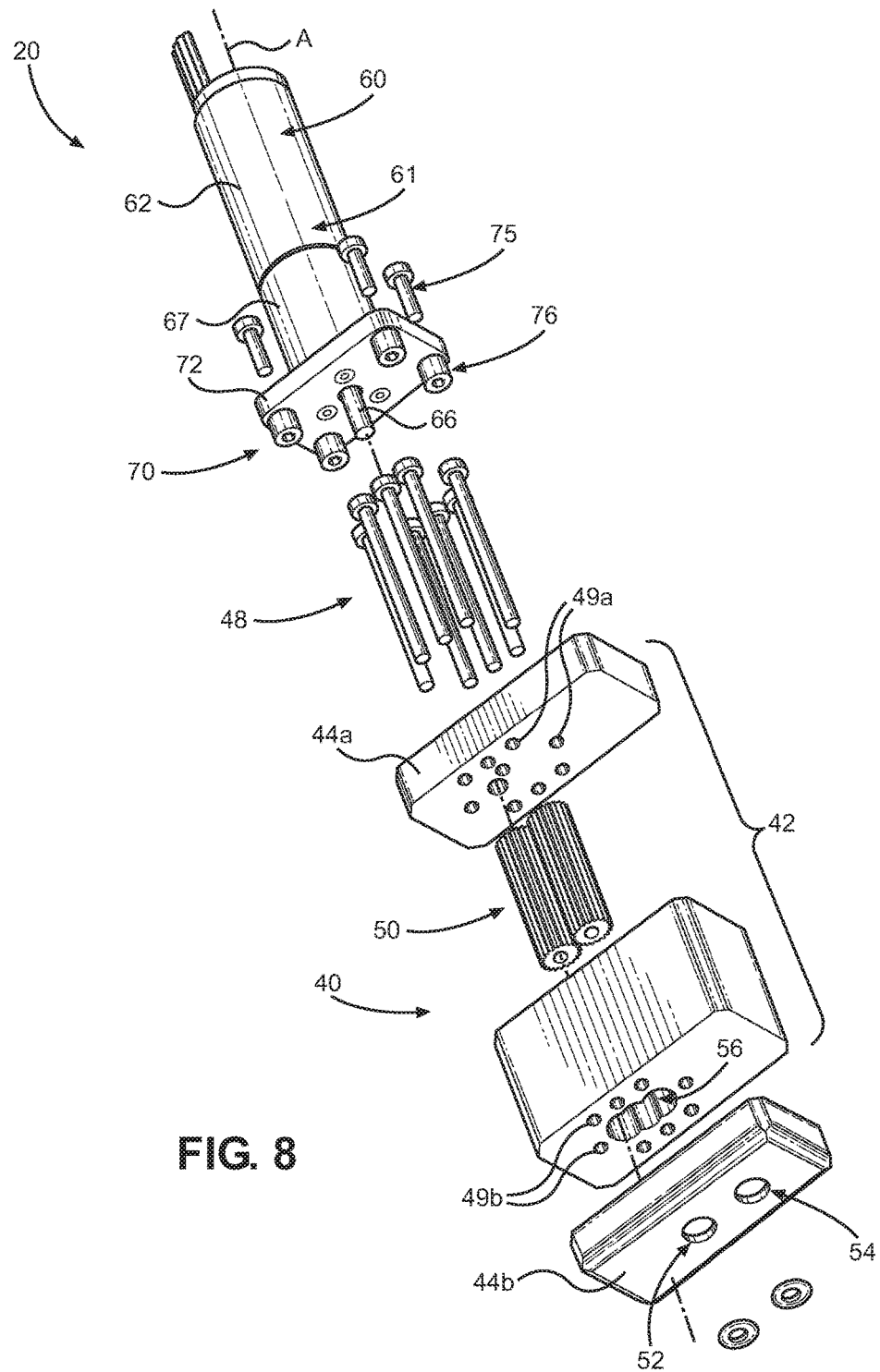
FIG. 8 is an exploded view of the pump assembly shown in FIG. 6.
Figure 9:
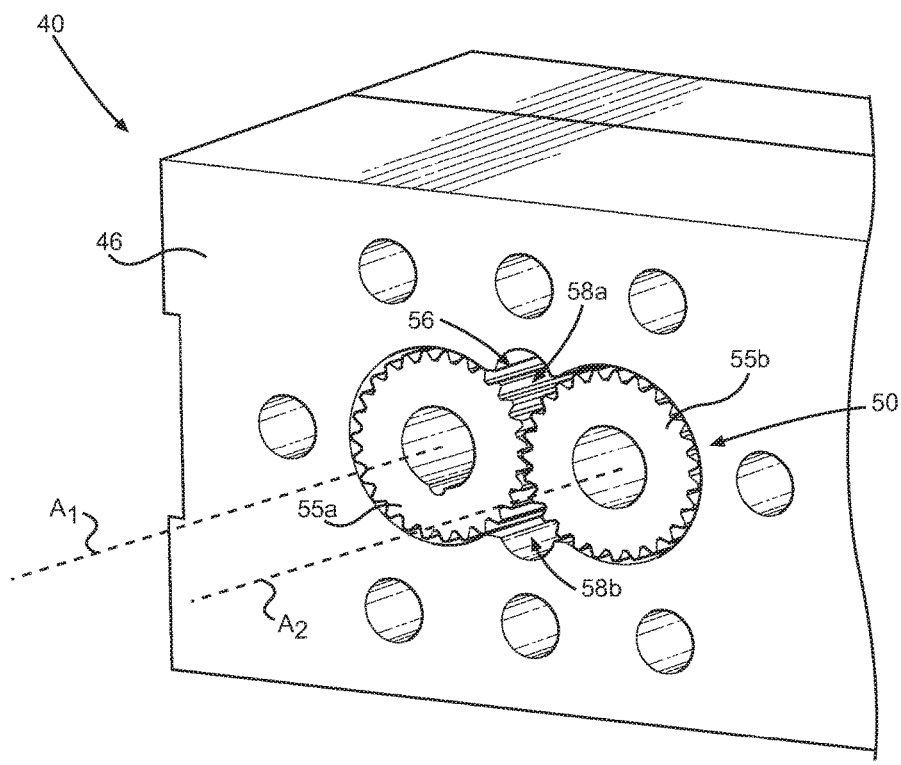
FIG. 9 is a sectional view of the pump assembly shown in FIG. 6.

The pump assembly 20g, however, is not associated with a particular dispensing module 16, but is designated as the recirculation pump assembly. The function of the recirculation pump assembly 20g may include pumping the adhesive through a recirculation channel 236, as will be described below. As such, the inlet 52 of the pump assembly 20g is in fluid communication with the recirculation channel 236, and the outlet of the pump assembly 20g is in fluid communication with the supply channel 200. Though the pump assembly 20g is shown as the pump assembly 20 positioned closest to the second side surface 34b, the recirculation pump assembly 20g may be positioned anywhere along the series of pump assemblies 20a-20g. For example, the recirculation pump assembly 20g may be positioned as the pump assembly closest to the first side surface 34a, or at a location in the middle of the pump assemblies 20a-20g. When the pump assembly 20g is positioned as the closest pump to the first or second side surface 34a or 34b of the applicator 10, the particular one of the first or second end plates 24 or 26 that the pump assembly 20g abuts may be configured to receive a portion of the pump assembly 20g. For example, as shown in FIG. 5, the second end plate 26 includes a recess 25 that is sized to receive a housing assembly 42 of the pump assembly 20g. When the pump assembly 20g is disposed in the recess 25, the pump assembly 20g may be substantially in line with the other pump assemblies 20a-20f along the longitudinal and transverse directions 2 and 6.

Additionally, though in this embodiment pump assembly 20g is configured to be the sole recirculation pump assembly for the applicator 10, it is contemplated that in other embodiments the applicator 10 can include multiple recirculation pump assemblies (not shown), each of which can be similarly configured as pump assembly 20g. For example, each dispensing module 16 can correspond to a unique recirculation pump assembly. Alternatively, the applicator 10 can include multiple recirculation pump assemblies that collectively pump adhesive through a single recirculation channel. In another embodiment with multiple recirculation pump assemblies, each recirculation pump assembly can pump adhesive through separate respective recirculation channels. Further, in other embodiments the applicator 10 can include a pump assembly that includes the functionality of both pumping adhesive to a dispensing module 16, as well as pumping adhesive through the recirculation channel. Such a pump assembly may be configured as a single dual-gear stack pump, where one gear stack functions to pump adhesive to a dispensing module 16, while the other functions to pump adhesive through the recirculation channel. Each gear stack can contain one driving gear and one driven gear, and each gear stack can be contained within a common pump body. Alternatively, each gear stack can be contained within separate respective pump bodies. Further, each gear stack can be driven by a common motor, or alternatively be independently driven by separate respective motors.

Referring to FIGS. 6-10, each pump assembly 20a-20g includes a pump 40 and a dedicated drive motor unit 60 that powers the pump 40. Because each pump 40 has a dedicated drive motor unit 60, each pump assembly 20 can be independently controlled by the operator and/or a control system (not shown). The pump assembly 20 also includes a thermal isolation region 70 positioned between the pump 40 and the drive motor unit 60. Thermal elements 23 may be used to elevate the temperature of the manifold 12, which, in turn, elevates the temperature of the pump 40 in each pump assembly 20. The thermal isolation region 70 minimizes thermal transfer from the pump 40 to the drive motor unit 60, thereby minimizing the effect of temperature on the electronic components in the drive motor unit 60. Exposing the electronic components in the drive motor unit 60 to a sufficiently elevated temperature may damage the electronic components, which may render the drive motor unit 60 inoperable.

The drive motor unit 60 includes a motor 62, an output drive shaft 66, and one or more connectors (not shown) that are coupled to a power source (not shown). The drive motor unit 60 is coupled to a gear assembly 67, which may include any type of gears as desired that transfer rotational motion from an output drive shaft 66 of the motor to the input drive shaft (not shown) of the pump to attain the desired rotational speed. In one embodiment, the gear assembly 67 includes a planetary gear train. The output drive shaft 66 has a drive axis A about which the drive shaft 66 rotates.

Referring back to FIGS. 3 and 4, the pump assembly 20 may be mounted to the manifold 12 in a number of different configurations. In one embodiment, the pump assembly 20 is mounted to the manifold 12 so that the bottom surface 41 of the pump 40, which includes an inlet 52 and an outlet 54, faces the manifold 12 at a location that is spaced apart from and located between the first and second side surfaces 34a and 34b. In this configuration, the drive motor axis A does not intersect either the first side surface 34a or the second side surface 34b of the applicator 10. Rather, the pump assembly 20 is positioned on the manifold 12 such that the drive motor axis A of the drive motor unit 60 may lie in a plane Y that is parallel to the first plane P1, in which the first side surface 34a lies, as described above. The plane Y may also be parallel to the second plane P2, in which the second side surface 34b lies. Each pump assembly 20a-20g has a respective axis A that lies within a respective plane that may be parallel to the first plane P1 and/or the second plane P2. Further, when mounted to the manifold 12, the pump assemblies 20a-20f can be positioned such that the inlets 52 of each of the pump assemblies 20a-20f are positioned above the outlets 54 along the transverse direction 6. However, the recirculation pump assembly 20g can be mounted to the manifold 12 such that the outlet 54 is positioned above the inlet 52 along the transverse direction 6.

Continuing with FIGS. 3 and 4, the pump assembly 20 is positioned on the manifold 12 such that the drive motor axis A is oriented in any particular direction within plane Y. For example, the pump assembly 20 can be positioned on the manifold 12 such that the drive motor axis A lies within plane Y and is angularly offset with respect to plane X. For instance, the pump assembly 20 can be positioned on the manifold 12 such that the drive motor axis A defines an angle θ with plane X. The angle θ can be any angle as desired. In one embodiment, the angle θ is an acute angle. Alternatively, the angle θ can be an obtuse angle, an angle greater than 180 degrees, or substantially 90 degrees.

Referring to FIGS. 6-10, the pump 40 includes a housing assembly 42 and a gear assembly 50 contained within the housing assembly 42. Alternatively, more than one gear assembly 50 may be contained within the housing assembly 42. The housing assembly 42 further includes an inlet 52 that is configured to receive adhesive from the manifold segment 22, as well as an outlet 54 for discharging adhesive back into the manifold assembly 22. In accordance with the embodiment illustrated in FIGS. 6-10, the inlet 52 and the outlet 54 of the pump 40 are defined by a bottom surface 41 of the pump 40 and are oriented in a direction that is parallel to the drive motor axis A of the drive motor unit 60.

The housing assembly 42 comprises an upper plate 44a, a lower plate 44b, and a central block 46. The upper and lower plates 44a and 44b are spaced from each other along a direction that is aligned with a drive axis A of the drive motor unit 60. The lower plate 44b defines a bottom surface 41, through which the drive axis A may extend. The upper plate 44a, the central block 46, and the lower plate 44b are coupled together with bolts 48. The upper plate 44a has a plurality of bores 49a that are configured to receive the bolts 48, the central block 46 has a plurality of bores 49b that are configured to receive the bolts 48, and the lower plate 44b has a plurality of bores 49c that are configured to receive the bolts 48. The bolts 48, bores 49a, bores 49b, and bores 49c may be threaded, such that the bores 49a-c are capable of threadedly receiving the bolts 48.

Figure 10:
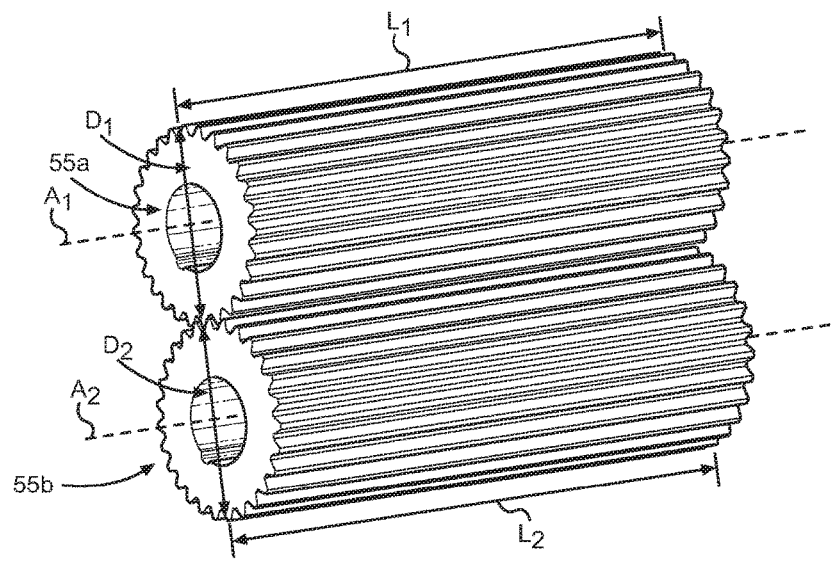
FIG. 10 is a perspective view of a gear assembly used in the pump assembly shown in FIGS. 6-9.

The central block 46 has an internal chamber 56 that is sized to generally conform to the profile of the gear assembly 50. In one embodiment, the gear assembly 50 includes a driven gear 55a and an idler gear 55b, which are known to a person of ordinary skill in the art. The driven gear 55a is coupled to the output drive shaft 66 of the drive motor unit 60 such that rotation of the drive shaft 66 rotates the driven gear 55a, which, in turn, rotates the idler gear 55b. The driven gear 55a rotates about a first axis $A_1$, while the idler gear 55b rotates about a second axis $A_2$. In FIG. 10, the first axis $A_1$ is illustrated as coaxial with the drive motor axis A. However, it is also contemplated that the first axis $A_1$ may be offset from the drive motor axis A. The gear assembly 50 may include an elongate gear shaft (not shown) that is coupled to an end of the output drive shaft 66 via a coupling (not shown). The gear shaft extends into the driven gear 55a, and is keyed to actuate the driven gear 55a. A seal member (not shown), such as a coating and/or an encasement, can be placed around the elongate gear shaft to facilitate sealing of the gear assembly 50 and internal chamber 56.

In use, rotation of the driven gear 55a and the idler gear 55b drives adhesive in the pump 40 from a first section 58a of the internal chamber 56 to a second section 58b of the internal chamber 56. The adhesive is then routed from the second section 58b of the internal chamber 56 to the outlet 54. In accordance with the illustrated embodiment, the driven gear 55a has a diameter $D_1$ and a length $L_1$, where the length $L_1$ may be greater than the diameter $D_1$. Likewise, the idler gear 55b has a diameter $D_2$ and a length $L_2$, where the length $L_2$ may be greater than the diameter $D_2$. While a gear assembly 50 with two gears is shown, the pump can have a gear assembly that has any number of gear configurations to produce the desired flow rate of adhesive through the pump 40. In these configurations, the central block 46 can be segmented to support gear stacking. In one embodiment, a plurality of gear assemblies (not shown) can be stacked along the pump input shaft. In this embodiment, the gear assemblies can have different outputs that are combined into a single output stream. In another embodiment, the gear assemblies have different outputs that can be kept separate to provide multiple outputs through additional porting in the lower plate 44b and the manifold 12.

Continuing with FIGS. 6-10, the thermal isolation region 70 is defined by a thermal isolation plate 72 and a gap 74 that extends from the thermal isolation plate 72 to the housing assembly 42. The pump assembly 20 includes bolts 75 that couple the thermal isolation plate 72 to the top of the housing assembly 42 so that the gap 74 is formed between the housing assembly 42 and the thermal isolation plate 72. The thermal isolation plate 72 can include a plurality of spacers 76 that are disposed around the bolts 75 and are positioned between a surface of the thermal isolation plate 72 and the upper plate 44a of the housing assembly 42. The spacers 76 may be monolithic with the thermal isolation plate 72, or may be separable from the thermal isolation plate 72 such that the gap 74 may be adjustable. The spacers 76 may extend inward from the upper plate 44a to ensure the motor output shaft 66 and the driven gear 55a are aligned. The thermal isolation plate 72 functions to inhibit the transfer of heat from the pump 40 to the drive motor unit 60. To do this, the thermal isolation plate 72 and the spacers 76 are made of a material that has a lower thermal conductivity than the adhesives that form the components of the housing assembly 42 and an outer casing 61 of the drive motor unit 60. Furthermore, the spacers 76 separate the thermal isolation plate 72 and the housing assembly 42 such that the thermal isolation plate 72 and the housing assembly 42 has the gap 74, which minimizes direct contact between the housing assembly 42 and the drive motor unit 60.

Referring to FIG. 3, each of the pump assemblies 20a-20g is removably attached to the manifold 12. In one embodiment, each pump assembly 20 is secured to a plate 28 via a fastener 27. The plate 28 is attached at one end to the first end plate 24 via a fastener 29, and at the opposite end to the second end plate 26 via another fastener 29. The fasteners 29 can also attach the plate 28 to one of the manifold segments 22. Fasteners 27 may be threaded, such that removing a pump assembly 20 from the manifold 12 requires unscrewing fastener 27 from the pump assembly 20 and removing the pump assembly 20 from the manifold 12. However, other methods of releasably attaching the pump assemblies 20 to the manifold 12 are contemplated, such as a slot and groove system, snap fit engagement, etc. Because the pump assemblies 20 may be releasably coupled to the manifold 12 in the above manner, a particular pump assembly 20 may be individually replaced without completely disassembling the entire applicator 10. Pump assemblies 20 may require replacement for a variety of reasons, including cleaning, damage, or changed adhesive pumping conditions or requirements.

Figure 11:
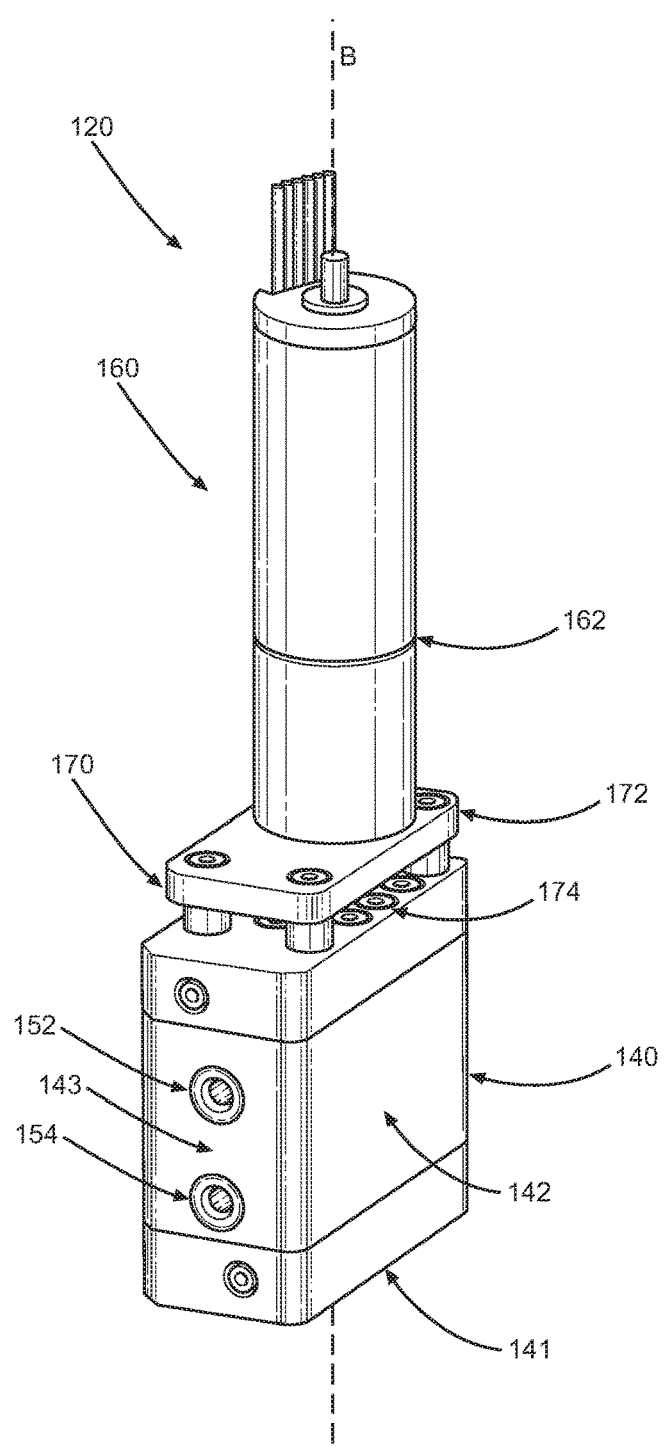
FIG. 11 is a perspective view of an alternative pump assembly that can be used in the applicator shown in FIG. 1.
Figure 12:
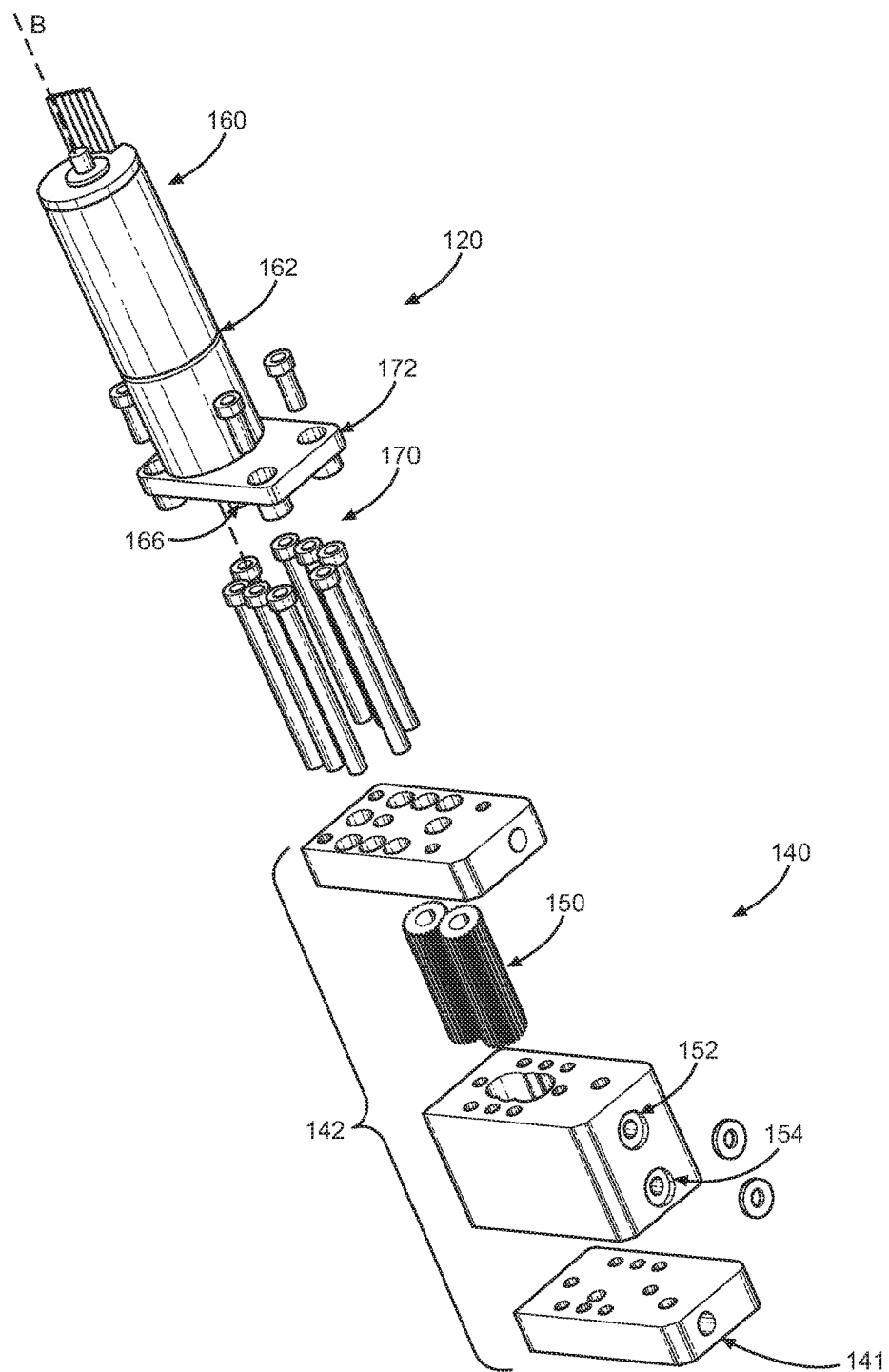
FIG. 12 is an exploded view of the pump assembly shown in FIG. 11.
Figure 13:
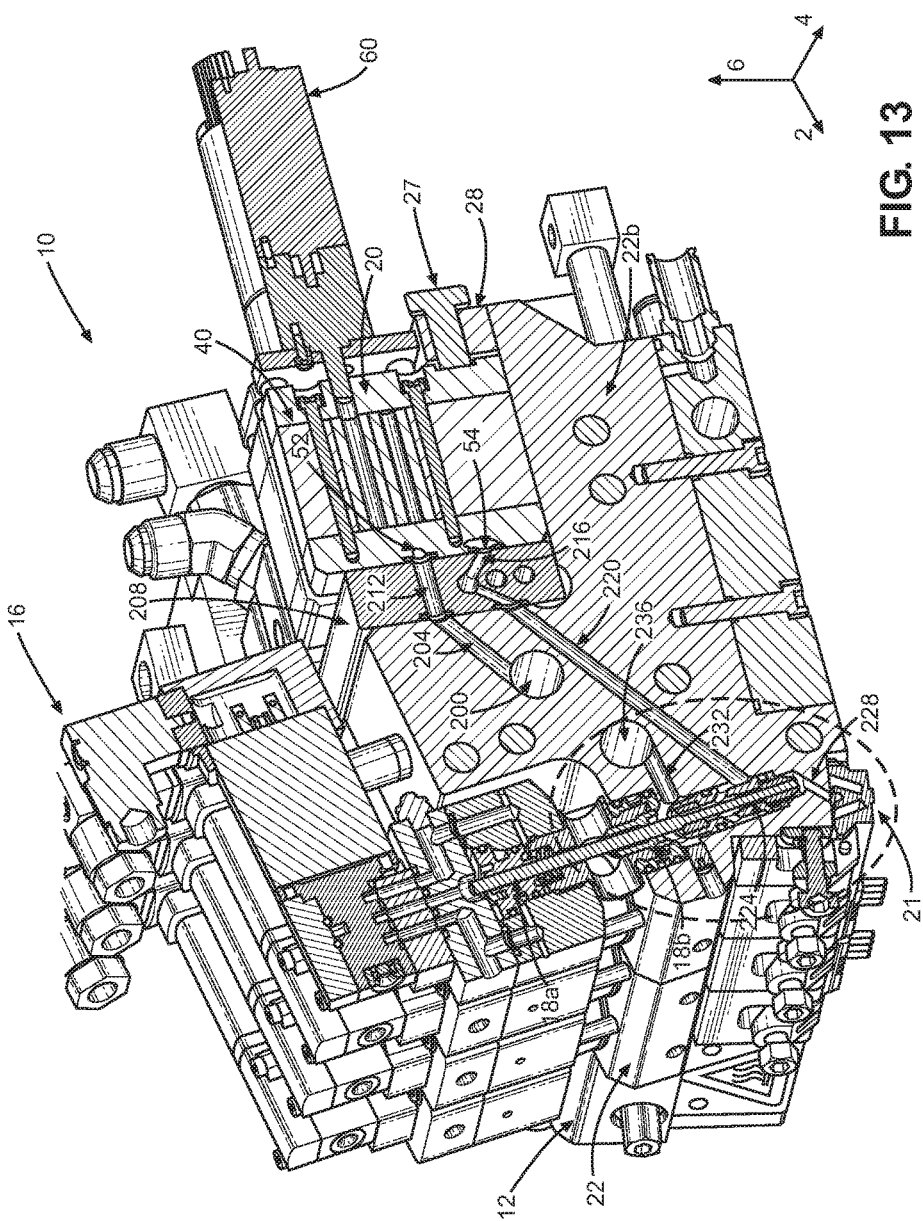
FIG. 13 is a perspective view of the applicator shown in FIG. 1, in horizontal cross-section.

FIGS. 11-12 illustrate another embodiment of the present invention. FIG. 13 shows a pump assembly 120 that is similar in most aspects to the pump assembly 20 shown in FIGS. 1-9 and described above. However, the pump assembly 120 has an inlet 152 and an outlet 154 that are oriented differently than the inlet 52 and outlet 54 of the pump assembly 20. The pump assembly 120 is configured to supply heated liquid to the manifold 12 at a given volumetric flow rate. Each pump assembly 120 includes a pump 140 and a dedicated drive motor unit 160 that powers the pump 140. The pump assembly 120 also includes a thermal isolation region 170 between the pump 140 and the drive motor unit 160. The thermal isolation region 170 is defined by a thermal isolation plate 172 and a gap 174 that extends from the thermal isolation plate 172 to the housing assembly 142. The thermal isolation region 170 minimizes thermal transfer of heat generated by the pump 140 to the drive motor unit 160, thereby minimizing the effect of temperature on the electronic components in the drive motor unit 160. The dedicated drive motor unit 160 and thermal isolation region 170 are the same as the drive motor unit 60 and the thermal isolation region 70 described above and illustrated in FIGS. 6-9.

Continuing with FIGS. 11-12, the drive motor unit 160 includes a motor 162, an output drive shaft 266, and connectors (not shown) that are coupled to a power source (not shown), as well as the control system 110. The drive shaft 166 has a drive axis B about which the drive shaft 166 rotates. When the pump assembly 120 is coupled to the manifold 12, the drive axis B may intersect and may be angularly offset with respect to the plane X that is perpendicular to the plane Y. In this configuration, the drive motor axis B does not intersect either the first side surface 34a or the second side surface 34b of the manifold 12. Additionally, the drive motor axis B does not intersect the bottom surface 30 of the manifold 12. Rather, the pump assembly 120 is positioned on the manifold 12 so that drive motor axis B of the drive motor unit 160 lies in a plane Y that is parallel to the first plane P1 and/or the second plane P2 of the first side surface 34a and the second side surface 34b, respectively.

The pump 140 defines a bottom surface 141 and a side surface 143, and includes a housing assembly 142 and one or more gear assemblies 150 contained within the housing assembly 142, an inlet 152 for receiving liquid from the manifold 12, and an outlet 154 for discharging liquid back into the manifold 12. In accordance with the illustrated embodiment, the inlet 152 and the outlet 154 of the pump 140 are disposed on the side surface 143 of the pump 140, such that the inlet 152 and outlet 154 are oriented in a direction that is perpendicular to the drive motor axis B of the drive motor unit 160.

Continuing with FIGS. 13-14, the flow path of adhesive through the applicator 10 will be described. The flow of adhesive through any particular element is represented by solid arrows that appear in the associated figures. The applicator 10 may be attached to an adhesive supply (not shown) by a hose (not shown), which attaches to the input connector 14 (FIG. 5). The adhesive supply can be any device capable of supplying adhesive to applicator 10. For example, the adhesive supply may be a melter configured to supply hot-melt adhesive to the applicator 10. The adhesive flows from the adhesive supply, through the hose, through the input connector 14, and into the supply channel 200 defined by the manifold 12 of the applicator 10. The supply channel 200 may extend from the first side surface 34a, through each of the manifold segments 22a-c, and to the second side surface 34b. However, the supply channel 200 may not necessarily extend entirely from the first side surface 34a to the second side surface 34b, but may terminate at an interior location between the first and second side surfaces 34a and 34b. Additionally, the supply channel 200 may extend between other combinations of surfaces of the manifold 12 as desired.

The manifold 12 includes a pressure release valve 17 that regulates flow in a pressure release channel (not shown) that is in fluid communication with the supply channel 200. The pressure release valve 17 is depicted as being positioned at the front surface 36 of the manifold 12. However, the pressure release valve can be positioned on any surface of the manifold 12 as desired. The pressure release valve 17 is capable of being alternated between an open and closed position. When an operator desires to relieve adhesive pressure within the supply channel 200, the pressure release valve 17 is switched from the closed to open positions. In the open position, adhesive flows from the supply channel 200, through the pressure release channel, and out of the applicator 10 through a drain (not shown). Pressure relief may be desired when the operator is about to commence a service or maintenance operation of the applicator 10.

As the supply channel 200 extends through the manifold 12, it supplies adhesive to each of the pump assemblies 20a-f, with the exception of the designated recirculation pump assembly 20g. For simplicity, a cross-section of the applicator 10 shown in FIGS. 13-14 only shows the supply of adhesive to one pump assembly 20 and one dispensing module. However, the supply channel 200 may supply each additional pump assembly 20 and dispensing module 16 similarly. The manifold segment 22 defines a first segment input channel 204, which extends from the supply channel 200 to a diverter plate 208, which may be positioned on the applicator 10 between the pump assembly 20d and the manifold segment 22b. The diverter plate 208 may be removably coupled to the applicator 10, and may define a variety of passages for carrying adhesive from the manifold 12, to the pump assemblies 20, and back. For example, as shown in FIG. 13, the diverter plate 208 defines a diverter input channel 212 that extends from the first segment input channel 204 to the inlet 52 of the pump assembly 20d. The diverter plate 208 may also define a diverter output channel 216 that extends from the outlet 54 of the pump assembly 20d to a second segment input channel 220. However, the diverter plate 208 may include different channel configurations than those shown. The diverter plate 208 shown in FIG. 13 may function as one of many interchangeable diverter plates that may be used to variably route the adhesive through the applicator 10 as different dispensing operations require.

Figure 14:
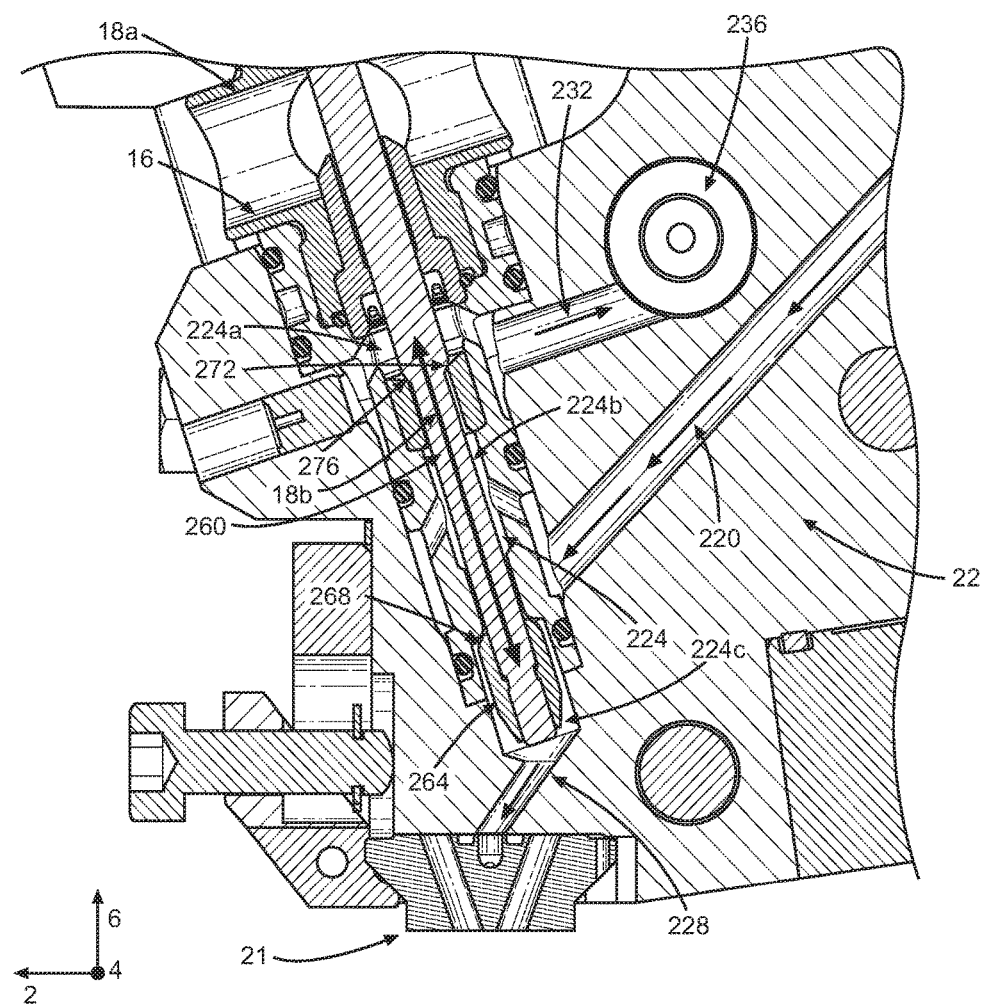
FIG. 14 is an enhanced view of the encircled region shown in FIG. 13.

In the embodiment shown in FIGS. 13-14, the adhesive flows from the supply channel 200, through the first segment input channel 204, through the diverter input channel 212, and to the inlet 52 of the pump assembly 20. The pump assembly 20 then pumps the adhesive out of the outlet 54 at a predetermined volumetric flow rate, which may be different than the volumetric flow rate of the adhesive upon entering the inlet 52 of the pump assembly 20. From there, the adhesive flows through the diverter output channel 216, through the second segment input channel 220, and to a dispensing flow path 224. The dispensing flow path 224 is defined by the lower portion 18b of the dispensing module 16, which is received by the manifold segment 22. The dispensing flow path 224 defines an upper section 224a, a lower section 224c opposite the upper section 224a, and a central section 224b disposed between the upper and lower sections 224a and 224c. The lower section 224c of the dispensing flow path 224 is in fluid communication with a nozzle channel 228, which extends away from the dispensing flow path 224. The upper section 224a of the dispensing flow path 224 is in fluid communication with a recirculation feed channel 232, which extends from the upper section 224a of the dispensing flow path 224 to a recirculation channel 236. The recirculation channel 236 will be discussed further below.

The lower portion 18b of the dispensing module 16 is the portion of the applicator 10 that directly interacts with the adhesive to control flow of the adhesive out of the applicator 10. The applicator 10 may include a valve stem 260 that extends from an upper portion 18a of the dispensing module 16 that is opposite the lower portion 18b of the dispensing module 16, to the lower portion 18b of the dispensing module 16. The valve stem 260 may define a lower valve element 264 and an upper valve element 272 that is spaced from the lower valve element 264 along the valve stem 260. The lower portion 18b of the dispensing module 16 may define a lower valve seat 268 that is configured to interact with the lower valve element 264 of the valve stem 260, and an upper valve seat 276 that is spaced from the lower valve seat 268, where the upper valve seat 276 is configured to interact with the upper valve element 272 of the valve stem 260.

In operation, the valve stem 260 may alternate between a first position and a second position. When the valve stem 260 is in the first position, the dispensing module 16 is in an open configuration. When the valve stem 260 is in the second position, the dispensing module 16 is in a closed configuration. The upper and lower valve elements 272 and 264 may substantially face in opposite directions, such that each of the upper and lower valve elements 272 and 264 interact with the corresponding upper and lower valve seats 276 and 268 in different ones of the first position and second position. In FIGS. 13-14, the upper valve element 272 is shown as facing away from the upper portion 18a of the dispensing module 16, while lower valve element 264 is shown as facing toward the upper portion 18a of the dispensing module 16. However, in another embodiment this relationship may be reversed, such that the upper valve element 272 faces toward the upper portion 18a of the dispensing module 16, while the lower valve elements 264 faces away from the upper portion 18a of the dispensing module 16. In one embodiment, in the first position, the valve stem 260 is lowered within the dispensing flow path 224, such that the upper valve element 272 of the valve stem 260 engages the upper valve seat 276, and the lower valve element 264 is spaced from the lower valve seat 268. In this position, the engagement between the upper valve element 272 and the upper valve seat 276 blocks adhesive from flowing from the central section 224b of the dispensing flow path 224 to the upper section 224a. Rather, the lack of engagement between the lower valve element 264 and the lower valve seat 268 permits adhesive to flow from the central section 224b of the dispensing flow path 224 to the lower section 224c. As such, when the valve stem 260 is in the first position, adhesive flows from the second segment input channel 220, through the central and lower sections 224b and 224c of the dispensing flow path 224, and to the nozzle channel 228. From the nozzle channel 228, the adhesive then flows through the nozzle 21 and out of the applicator 10. Accordingly, the first position of this embodiment is the position in which the applicator 10 applies adhesive to a substrate during a manufacturing operation.

In the second position, the valve stem 260 is raised within the dispensing flow path 224, such that the upper valve element 272 of the valve stem 260 is spaced from the upper valve seat 276, and the lower valve element 264 engages the lower valve seat 268. In this position, the engagement between the lower valve element 264 and the lower valve seat 268 blocks adhesive from flowing from the central section 224b of the dispensing flow path 224 to the lower section 224c. Rather, the lack of engagement between the upper valve element 272 and the upper valve seat 276 permits adhesive to flow from the central section 224b of the dispensing flow path 224 to the upper section 224a. As such, in the second position, adhesive flows from the second segment input channel 220, through the central and upper sections 224b and 224a of the dispensing flow path 224, and to the recirculation feed channel 232. From the recirculation feed channel 232, the adhesive flows into the recirculation channel 236. Though one dispensing module 16 and manifold segment 22 is shown in cross section in FIGS. 13-14, each additional dispensing module 16 and manifold segments 22 may be similarly configured. Further, the valve stem 260 of each dispensing module 16 may be configured to be actuated between the first and second positions independent of any of the other valve stems 260, such that at any time the valve stems 260 of the dispensing modules 16 may be in any combination of the first and second positions. Alternatively, any combination of the valve stems 260 may be configured to transition between the first and second positions in unison.

The ability to alternate the valve stem 260 between the particular first and second positions described above serves several purposes. One purpose is that, during an adhesive dispensing operation, a consistent flow of adhesive may not be required or desired. As such, an operator of the applicator 10 must be able to selectively actuate the dispensing modules 16 to both provide and prevent a flow of adhesive to the substrate. Transitioning the valve stem 260 from the first position to the second position blocks adhesive from exiting the applicator 10, while transitioning the valve stem 260 from the second position to the first position allows adhesive to exit the applicator 10. Another purpose of the alternative valve stem 260 described above relates to the pressure within the flow path of the adhesive. When the valve stem 260 is in the first position, the adhesive is permitted to flow through the gap between the lower valve element 264 and the lower valve seat 268, and exit the applicator 10 through the nozzle 21. However, when the valve stem 260 is in the second position, the adhesive cannot flow through this gap. As such, the potential exists for unused adhesive to back up within the dispensing flow path 224 and/or the second segment input channel 220. This back-up can cause pressure to build up within the applicator 10. This pressure, upon the next transition of the valve stem 260 from the second position to the first position, can cause a pattern deformation, such as hammerhead, of the adhesive on the substrate.

The inclusion of the recirculation channel 236 in the applicator 10 helps alleviate this issue. When the valve stem 260 is in the second position, the ability of the adhesive to flow from the central section 224b of the dispensing flow path 224 to the upper section 224a, and through the recirculation feed channel 232 to the recirculation channel 236 provides the adhesive the ability to escape the dispensing flow path 224. This may alleviate any pressure build-up that could occur when the valve stem 260 is in the second position, thus aiding in standardizing the flow of adhesive through the nozzle 21 when the valve stem 260 is in the first position. However, the addition of the recirculation channel 236 alone may not fully rectify this issue. Adhesive flowing through recirculation channel 236 inherently creates some amount of pressure within the recirculation channel 236. In a configuration where the recirculation channel 236 directs the adhesive back to the inlet 52 of the pump assembly 20, or to supply tank that supplies the adhesive to the applicator 10, a differential may exist between the pressure of the adhesive flowing through the recirculation channel 236 and the adhesive flowing through the supply channel 200 when the valve stem 260 is in the second position. This pressure differential, like the differential that may exist without the recirculation channel 236 when the valve stem 260 is in the second position, may negatively impact the flow rate of the adhesive from the applicator 10 when the valve stem 260 is in the first position. In particular, this differential may cause the flow rate of the adhesive flowing through the nozzle 21 to be inconsistent.

Figure 15:
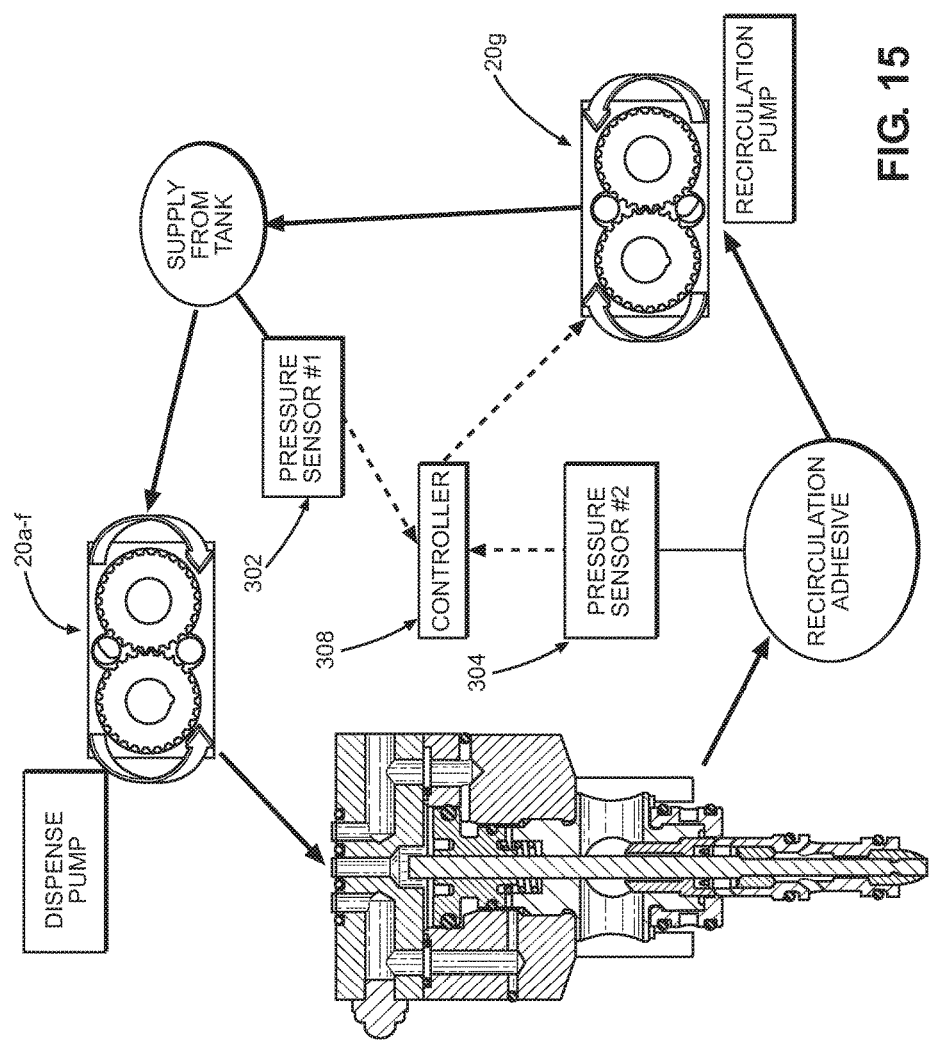
FIG. 15 is a process flow diagram illustrating a method of adhesive recirculation according to an embodiment of the present disclosure.

FIG. 15 illustrates a process flow diagram depicting a system for managing the flow of adhesive through the recirculation channel 236. Solid lines and arrows indicate the flow of adhesive through the applicator 10, and dashed lines and arrows indicate the transfer of information. The adhesive flows from an adhesive supply (not shown), through a hose (not shown) that is coupled to the input connector 14 (FIG. 1) of the applicator 10, and into the supply channel 200. As the adhesive flows through the supply channel 200, it flows at a first pressure. To detect the first pressure, a first pressure sensor 302 may be disposed within the supply channel 200. The first pressure sensor 302 may be any type of pressure sensor that is capable of measuring the pressure of a fluid, such as, for example, a pressure transducer. The first pressure sensor 302 may measure the first pressure of the adhesive as it flows through the supply channel 200 to the pump assembly 20. The adhesive then flows through dispensing pumps 20a-f, which subsequently pump the adhesive to the dispensing modules 16a-f. When the valve stems 260 of the dispensing modules 16a-f are in the first position, the adhesive flows out of the nozzles 21. Alternatively, when the valve stems 260 are in the second position, the adhesive flows into recirculation channel 236. The adhesive from each of the dispensing modules 16a-f that flows into the recirculation channel 236 is directed to the recirculation pump assembly 20g. As the adhesive flows through the recirculation channel 236, it flows at a second pressure. To detect the second pressure, a second pressure sensor 304 may be disposed within the recirculation channel 236. The second pressure sensor 304, like the first pressure sensor 302, may be any type of pressure sensor that is capable of measuring the pressure of a fluid, such as a pressure transducer.

Upon measuring the first and second pressures, the first and second pressure sensors 302 and 304 transmit the first and second pressures to a controller 308. The controller 308 may include one or more processors, one or more memories, input/output components, and a user interface, and may comprise any device capable of including those components. The user interface may include a touchscreen, mouse, keyboard, buttons, dials, etc. The input/output components may be configured to receive signals containing the first and second pressures from the first and second pressure sensors 302 and 304 via a wired and/or wireless connection, or any other communication means capable of transmitting such data. The controller 308, using the pressure information received from the first and second pressure sensors 302 and 304, may actively direct the operation of the recirculation pump assembly 20g. Accordingly, the pump assembly 20g is operable independent of the other pump assemblies 20a-20f.

The recirculation pump assembly 20g functions to pump adhesive from the recirculation channel 236 back to the supply channel 200. In controlling the recirculation pump assembly 20g, the controller 308 actively controls the flow rate at which the recirculation pump assembly 20g pumps the adhesive through the recirculation channel 236 by automatically adjusting the speed (RPM) of the drive motor. As a result, the controller 308 can direct the recirculation pump assembly 20g to pump the adhesive at a flow rate sufficient to substantially equalize the second pressure of the adhesive flowing through the recirculation channel 236 with the first pressure of the adhesive flowing through the supply channel 200. Particularly, the controller 308 can direct the recirculation pump assembly 20g to increase the motor speed, decrease the motor speed, or maintain the same motor speed in response to either or both of the first and second pressures received from the first and second pressure sensors 302 and 304. This functions to attenuate any differential between the first and second pressures, which can aid in maintaining continuity in the volumetric output of the adhesive that is applied to a substrate via nozzles 21. Though the controller 308 may be capable of autonomously controlling operation of the recirculation pump assembly 20g such that the first and second pressures are substantially equal, or the differential between the first and second pressures is neutralized, an operator of the applicator 10 may optionally be able to manually control operation of the recirculation pump assembly 20g through the user inputs of the controller 308, or by running a program stored in the memory of the controller 308.

Though shown in FIGS. 1-5 as being mounted to the manifold 12, the recirculation pump assembly 20g may be spaced from the manifold 12. In this configuration, the recirculation pump assembly 20g is connected to the manifold via one or more hoses, such allowing the pump assembly 20g to receive adhesive from and pump adhesive to the manifold 12. For example, one hose may direct adhesive from the recirculation channel 236 to the recirculation pump assembly 20g, while a second hose may direct adhesive from the recirculation pump assembly 20g to the supply channel 200.

The presence of the dedicated recirculation pump assembly 20g to actively regulate pressure of adhesive flowing through the recirculation channel 236 of the applicator 10 may simplify the overall construction of the applicator 10. For example, with the recirculation pump assembly 20g, a second hose that connects the recirculation channel 236 to the adhesive supply (not shown) is not required. Additionally, the applicator 10 becomes better adapted to accommodating different applications. As a client's requirements change, the recirculation pump assembly 20g adapts to likewise actively regulate the pressure within the applicator 10, such that the pressure differential between the recirculation channel 236 and the supply channel 200 remains minimal or nonexistent, regardless of application.

The presence of the recirculation pump assembly 20g further aids in maintaining tighter tolerances in the flow rate of adhesive exiting the applicator 10 through nozzles 21. Despite the intermittent operation of the dispensing modules 16, actively regulating the pressure of the adhesive in the recirculation channel 236 allows for a controllable and consistent flow rate of adhesive exiting the applicator 10, as opposed to the flow rate being simply a function of the pressure of adhesive in the recirculation channel 236 and the supply channel 200 at any given time. This consistent flow rate helps reduce costs incurred during a dispensing operation, particularly in the substrates to which the adhesive is applied. Though some substrates may be more accommodating of the effects of pattern deformations of the adhesive applied to the substrate, some substrates are more sensitive to such variations in adhesive flow. These differences in flow rates can result in substrate deformation or "burn through." By actively regulating the adhesive pressure using recirculation pump assembly 20g to ensure a consistent flow rate, wasted substrate can be avoided, thus reducing costs for the operator of the applicator 10.

Figure 16:
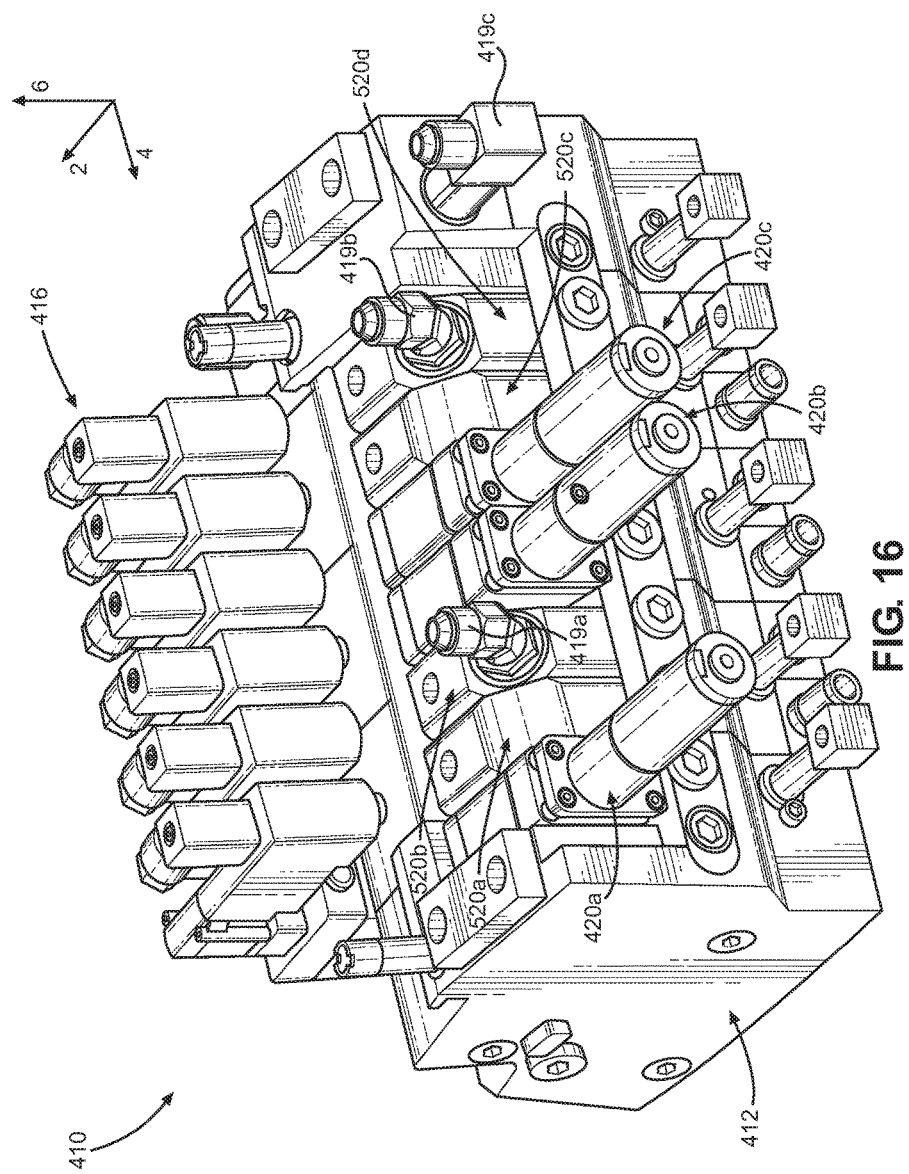
FIG. 16 is a rear perspective view of an applicator according to another embodiment of the present invention.

Another embodiment of the present disclosure is a hybrid applicator for dispensing the adhesive. FIG. 16 illustrates an applicator 410. The hybrid applicator 410 is configured for both metered output and pressure fed output. The applicator 410 is similar to the applicator 10 described above. For instance, the hybrid applicator 410 includes dispensing module(s) 416 and a unitary or segmented manifold 412.

The hybrid applicator 410 includes at least one pump assembly 420 (or pump assembly 120) and at least one pressure feed block 520, each of which is coupled to the manifold 412. Regarding this embodiment, reference number 420 can be used interchangeably with the reference number 420a-420c unless noted otherwise. In accordance with the embodiment illustrated in FIG. 16, the applicator 10 includes three pump assemblies 420a, 420b and 420c, as well as four pressure feed blocks 520a, 520b, 520c and 520d. However, the applicator 410 can include any number of pump assemblies 420 and pressure feed blocks 520. Any of the pump assemblies 420a-c can be configured to operate as the recirculation pump assembly, as described in relation to pump assembly 20g above.

Continuing with FIG. 15, the pump assembly 420 is substantially the same as pump assembly 20 (or pump assembly 120), as described above. The pump assembly 420 receives adhesive from flow channels in the manifold 412, which are ported to the input 419c. Pressure feed blocks 520a and 520c include inlets and outlets that receive adhesive from the manifold supplied through the input 419c. The pressure feed blocks 520b and 520d are supplied adhesive through inputs 419a and 419b, which receive adhesive from an adhesive supply (not shown). A pump (not shown) near the adhesive supply may be used to feed the adhesive through hoses to inputs 419a and 419b, which are coupled to the pressure feed blocks 520b and 520d, respectively. Heat from the manifold 412 then is transferred to the pressure feed blocks 520a-520d, thereby heating the adhesive within the pressure feed block 520. As shown, the hybrid applicator 410 has multiple input fittings 419a-419c, some which are associated with a pressure feed block(s), that can be used to supply different types of adhesive to the applicator 410.

Combining a pump assembly 420 with a pressure feed block 520 increases process flexibility of the applicator 410. For example, the pump assembly 420 permits precise metering of adhesive streams from the dispensing module 416, while other adhesive streams are associated with the less precise pressure feed blocks 520. It should be appreciated that the hybrid applicator 410 can be metered, pressure-fed, and multi-zone pressure-fed, all within a single manifold as needed.

While the invention is described herein using a limited number of embodiments, these specific embodiments are not intended to limit the scope of the invention as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in a particular order as desired.

What is claimed is:

1. An applicator for dispensing adhesive, the applicator comprising:
    a manifold;
    at least one dispensing module coupled to said manifold;
    at least one pump assembly configured to pump the adhesive to the at least one dispensing module;
    a supply channel configured to provide the adhesive to the at least one pump assembly;
    a recirculation channel configured to provide the adhesive to the supply channel;
    a recirculation pump assembly connected to said manifold, said recirculation pump assembly having:
        an inlet in fluid communication with said recirculation channel;
        an outlet in fluid communication with said supply channel;
        a gear assembly; and
        a drive motor coupled to said gear assembly and operable to pump the adhesive,
    wherein the drive motor is configured to operate at an adjustable number of revolutions per minute (RPM) independent of the at least one pump assembly.

2. The applicator of claim 1, wherein said supply channel includes a first pressure transducer and said recirculation channel includes a second pressure transducer, wherein said first and second pressure transducers each generate a signal that is transmitted to the drive motor.

3. The applicator of claim 2, wherein said drive motor is configured to change the RPM in response to pressure of the adhesive within said supply channel determined by said first pressure transducer, pressure of the adhesive within said recirculation channel determined by said second pressure transducer, or both the pressure of the adhesive within said supply channel and the pressure of the adhesive within said recirculation channel.

4. The applicator of claim 1, wherein the recirculation pump assembly pumps the adhesive from the recirculation channel to the supply channel.

5. The applicator of claim 1, further comprising a controller in communication with said drive motor to automatically change the RPM such that pressure of the adhesive in said recirculation channel is substantially equal to the pressure of the adhesive in said supply channel.

6. The applicator of claim 1, wherein said recirculation pump assembly is mounted to said manifold.

7. The applicator of claim 1, wherein said recirculation pump assembly is spaced from said manifold and is connected to said manifold by one or more hoses.

8. A method of managing pressure variance in an adhesive applicator, the method comprising:
    pumping adhesive from a supply channel through a dispensing module via a pump assembly;
    switching said dispensing module between 1) an open configuration during which the adhesive flows through a nozzle and 2) a closed configuration during which adhesive flows into a recirculation channel;
    pumping, via a recirculation pump, at least a portion of the adhesive through said recirculation channel; and
    adjusting operation of said recirculation pump independent of operation of said pump assembly.

9. The method of claim 8, further comprising:
    measuring a first pressure of the adhesive in said recirculation channel;
    measuring a second pressure of the adhesive in said supply channel; and
    automatically actuating said recirculation pump in response to measuring the first pressure and measuring the second pressure.

10. The method of claim 9, wherein actuating said recirculation pump comprises adjusting an RPM of said recirculation pump such that the first pressure and the second pressure are substantially equal.

11. The method of claim 9, wherein actuating said recirculation pump comprises pumping the adhesive from said recirculation channel to said supply channel.

12. A recirculation pump assembly for pumping adhesive, the recirculation pump assembly comprising:

an inlet configured to receive the adhesive from a recirculation channel;

an outlet configured to emit the adhesive to a supply channel;

a gear assembly; and a drive motor coupled to said gear assembly and operable to pump the adhesive, wherein said recirculation pump assembly is configured to move at least a portion of the adhesive from said recirculation channel to said supply channel, and said drive motor is configured to operate at an adjustable number of revolutions per minute (RPM) so as to maintain a first pressure of the adhesive in said recirculation channel substantially equal to a second pressure of the adhesive in said supply channel.

13. The recirculation pump assembly of claim 12, wherein said drive motor is configured to automatically change the RPM in response to a change in the first pressure, the second pressure, or both the first and second pressures.

14. The recirculation pump assembly of claim 12, further comprising a controller in communication with said recirculation pump assembly, said controller being configured to cause change in the RPM of said drive motor.

* * * * *